(12) United States Patent
Ono et al.

(10) Patent No.: US 7,692,326 B2
(45) Date of Patent: Apr. 6, 2010

(54) HYBRID TURBOCHARGER

(75) Inventors: Yoshihisa Ono, Nagasaki-ken (JP);
Keiichi Shiraishi, Nagasaki-ken (JP);
Yoshitsugu Aono, Nagasaki-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 408 days.

(21) Appl. No.: 11/892,705

(22) Filed: Aug. 27, 2007

(65) Prior Publication Data
US 2008/0203732 A1   Aug. 28, 2008

(30) Foreign Application Priority Data
Feb. 23, 2007   (JP) .............................. 2007-044027

(51) Int. Cl.
*F01D 5/08*   (2006.01)
*F02B 33/44*   (2006.01)

(52) U.S. Cl. .......................................... 290/52; 60/612

(58) Field of Classification Search ................... 290/52, 290/49; 60/624, 605.1, 612
See application file for complete search history.

(56) References Cited

U.S. PATENT DOCUMENTS

| | | | | |
|---|---|---|---|---|
| 4,082,477 | A * | 4/1978 | Kronogard | 415/120 |
| 4,253,031 | A * | 2/1981 | Frister | 290/52 |
| 4,827,170 | A * | 5/1989 | Kawamura et al. | 310/156.28 |
| 5,870,894 | A * | 2/1999 | Woollenweber et al. | 60/607 |
| 5,902,546 | A * | 5/1999 | Kawasetsu et al. | 420/528 |
| 6,418,723 | B1 * | 7/2002 | Gladden | 60/612 |
| 6,834,501 | B1 * | 12/2004 | Vrbas et al. | 60/612 |
| 7,302,800 | B2 * | 12/2007 | Klingel | 60/612 |
| 7,461,507 | B2 * | 12/2008 | Arnold et al. | 60/605.1 |
| 2004/0200215 | A1 | 10/2004 | Woollenweber et al. | |
| 2008/0236261 | A1 * | 10/2008 | Ono et al. | 73/112.01 |

(Continued)

FOREIGN PATENT DOCUMENTS

EP   0087316 A1   8/1983

(Continued)

OTHER PUBLICATIONS

European Search Report dated Jul. 16, 2008, issued in corresponding European Patent Application No. 07114666.6.

*Primary Examiner*—Nicholas Ponomarenko
(74) *Attorney, Agent, or Firm*—Westerman, Hattori, Daniels & Adrian, LLP

(57) ABSTRACT

There is provided a hybrid turbocharger that allows easy and quick attachment/removal of a coupling attachment boss to which an end section of a coupling is attached, thereby reducing the amount of operation time required for an overhaul of the turbocharger. The hybrid turbocharger includes: a turbine section that is driven by exhaust gas introduced from an internal combustion engine; a compressor section that is driven by the turbine section to pressure-feed outside air into the internal combustion engine; and a power generator having a rotating shaft coupled to a rotating shaft of the turbine section and the compressor section via a coupling. A coupling attachment boss to which one end section of the coupling is coupled, intervenes and is fixed, via a boss fixing nut that screws onto a screw section formed on a tip end of one end section of the rotating shaft of the turbine section and the compressor section, between one end surface of a turbine rotor that constitutes the turbine section or one end surface of a compressor impeller that constitutes the compressor section, and the boss fixing nut.

3 Claims, 4 Drawing Sheets

U.S. PATENT DOCUMENTS

2008/0295516 A1* 12/2008 Teshima et al. ............... 60/624
2009/0241542 A1* 10/2009 Ono et al. .................... 60/624

FOREIGN PATENT DOCUMENTS

| | | | |
|---|---|---|---|
| JP | 61261623 A | 11/1986 | |
| JP | 2004132264 A | 4/2004 | |
| JP | 2004-346803 A | 12/2004 | |
| WO | WO 2005/119027 A1 | 12/2005 | |
| WO | WO 2005/124121 A1 | 12/2005 | |

* cited by examiner

HYBRID TURBOCHARGER

BACKGROUND OF THE INVENTION

1. Field of the Invention

The present invention relates to a hybrid turbocharger, in particular, to a hybrid turbocharger to be installed in a shipboard internal combustion engine, an internal combustion engine for a land power generator, and so forth.

This application is based on Japanese Patent Application No. 2007-044027, the content of which is incorporated herein by reference.

2. Description of Related Art

As such a hybrid turbocharger, one equipped with a power generator, a rotating shaft of which is coupled to a rotating shaft of a turbine and a compressor of a turbocharger, is known (for example, Japanese Unexamined Patent Application, Publication No. 2004-346803).

There is a hybrid turbocharger having such a configuration, in which the rotating shaft of the turbine and the compressor is coupled to the rotating shaft of the power generator via a coupling. Moreover, for example, one end section of this coupling is coupled to a first coupling attachment boss fixed to the rotating shaft of the power generator by means of shrink fitting, and the other end section of this coupling is coupled to a second coupling attachment boss fixed to the rotating shaft of the turbine and the compressor by means of shrink fitting. As a result, in the case of a need for carrying out an overhaul of the turbocharger, such as where a compressor impeller is removed from the rotating shafts of the turbine and the compressor, there is a problem in that the second coupling attachment boss can not be easily and quickly removed from the rotating shaft of the turbine and the compressor, and hence overhaul of the turbocharger is time-consuming.

BRIEF SUMMARY OF THE INVENTION

The present invention takes the above circumstances into consideration, and its object is to provide a hybrid turbocharger that allows easy and quick attachment/removal of a coupling attachment boss to which an end section of a coupling is attached, thereby reducing the amount of operation time required for an overhaul of the turbocharger.

In order to solve the above problems, the present invention employs the following means.

The hybrid turbocharger according to the present invention includes: a turbine section that is driven by exhaust gas introduced from an internal combustion engine; a compressor section that is driven by the turbine section to pressure-feed outside air into the internal combustion engine; and a power generator having a rotating shaft coupled to a rotating shaft of the turbine section and the compressor section via a coupling, wherein a coupling attachment boss to which one end section of the coupling is coupled, intervenes and is fixed, via a boss fixing nut that screws onto a screw section formed on a tip end of one end section of the rotating shaft of the turbine section and the compressor section, between one end surface of a turbine rotor that constitutes the turbine section or one end surface of a compressor impeller that constitutes the compressor section, and the boss fixing nut.

According to the hybrid turbocharger of the present invention, just by unfastening the boss fixing nut fastened to the tip end of the one end section of the rotating shaft of the turbine section and compressor section and removing this boss fixing nut from the tip end of the one end section of the rotating shaft, the coupling attachment boss to which the one end of section of the coupling is attached (fixed) can be easily and quickly removed, and just by attaching the boss fixing nut to the tip end of the one end section of the rotating shaft and fastening this boss fixing nut to the tip end of the one end section of the rotating shaft, the coupling attachment boss to which the one end section of the coupling is attached (fixed) can be easily and quickly attached. As a result, the amount of operation time required for an overhaul of a turbocharger can be reduced.

Moreover, in the case where a key or the like is used when attaching the coupling attachment boss to the tip end of the one end section of the rotating shaft, the structure (shape) of the tip end of the one end section of the rotating shaft needs to have a structure (shape) different from that of a conventional rotating shaft (existing rotating shaft). However, in the present invention, such a structure (shape) change does not have to be made. Therefore, the present invention can easily be applied to a conventional rotating shaft (specifically to an existing turbocharger).

In the above hybrid turbocharger, it is further preferable that on the one end surface of the turbine rotor or on the surface of a washer fixed on the one end surface of the turbine rotor, or on the one end surface of the compressor impeller or on the surface of a washer fixed on the one end surface of the compressor impeller, there is provided at least one groove section, and, on a tip end of one end section of the coupling attachment boss there is provided a claw section that is fitted into the groove section.

According to such a hybrid turbocharger, since the claw section provided on the tip end of the one end section of the coupling attachment boss is configured so as to be fitted into the groove section provided on the one end surface of the turbine rotor (more specifically the turbine disk) or on the surface of the washer fixed on the one end surface of the turbine rotor, or into the groove section provided on the one end surface of the compressor impeller (more specifically the hub) or on the surface of the washer fixed on the one end surface of the compressor impeller, the rotational torque of the rotating shafts of the turbine section and the compressor section can be reliably transmitted to the coupling via the claw section and the groove section.

Since the internal combustion engine according to the present invention is equipped with the hybrid turbocharger which is able to reduce the amount of operation time required for an overhaul of the turbocharger, then even if the internal combustion engine is stopped due to a defect of the turbocharger, the stop time of the internal combustion engine can be reduced and operation rate of the internal combustion engine can be improved.

According to the present invention, an effect can be achieved in which the coupling attachment boss to which an end section of the coupling is attached can be easily and quickly fitted/removed, and the amount of operation time required for an overhaul of the turbocharger can be reduced.

DETAILED DESCRIPTION OF THE INVENTION

Hereunder, an embodiment of a hybrid turbocharger according to the present invention is described, with reference to the drawings.

Figure 1:
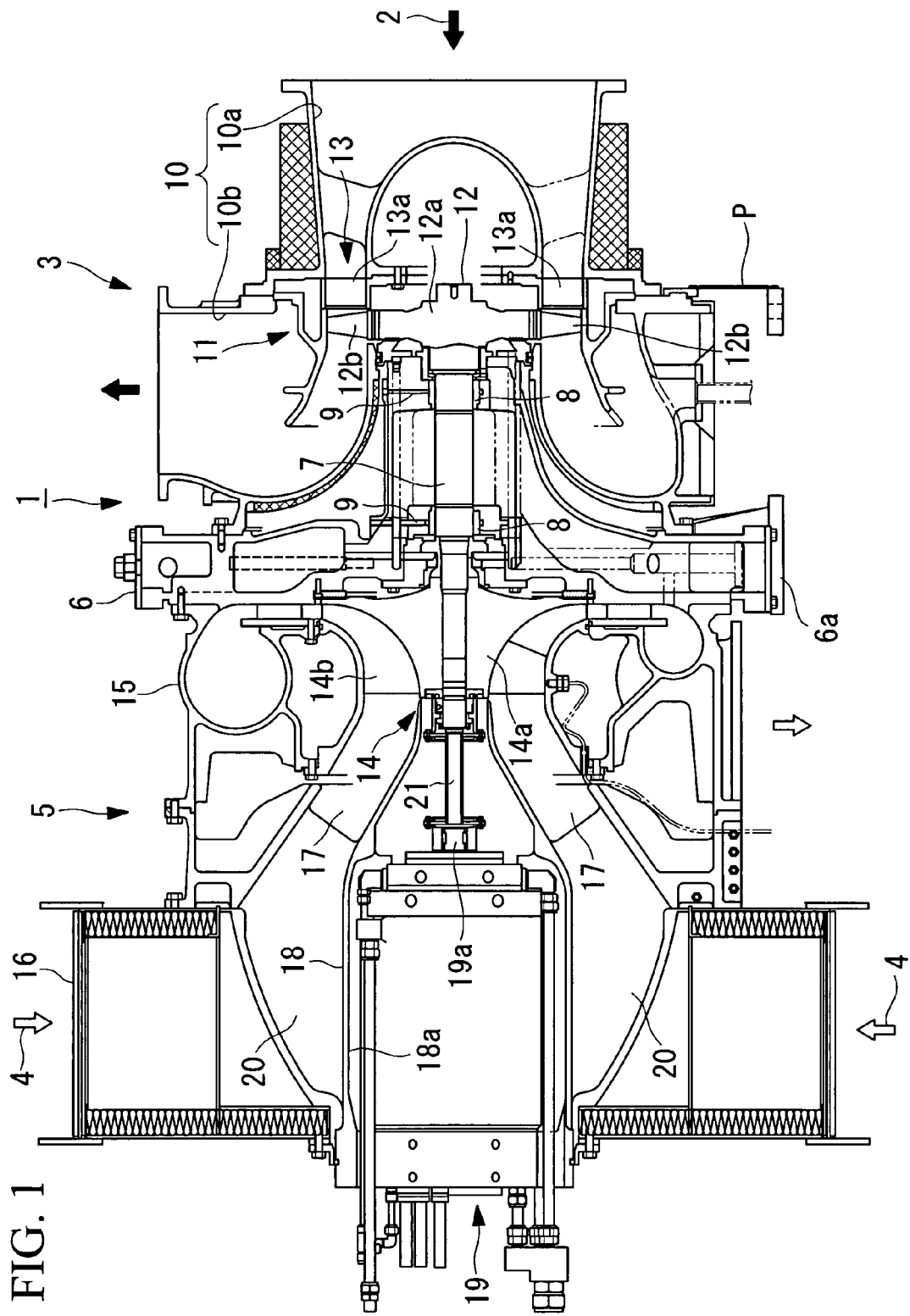
FIG. 1 is a longitudinal sectional view showing a hybrid turbocharger according to an embodiment of the present invention.
Figure 2:
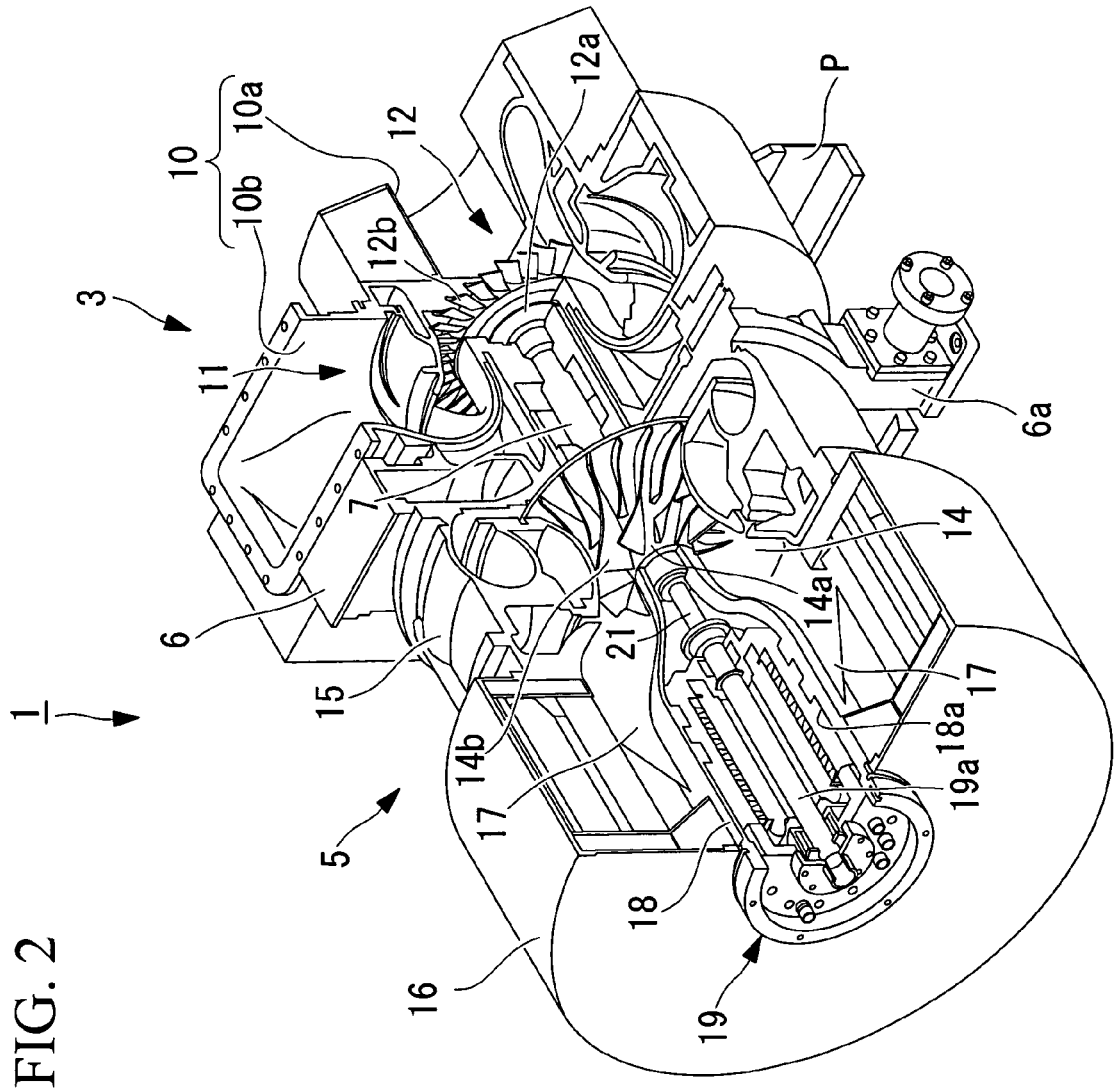
FIG. 2 is a partial cutaway perspective view showing of the hybrid turbocharger shown in FIG. 1 as seen from a silencer side.

As shown in FIG. 1 and FIG. 2, a hybrid turbocharger 1 according to the present embodiment comprises main components namely: a turbine section 3 driven by exhaust gas (combustion gas) 2 introduced from an internal combustion engine (not shown in the drawing) (for example, a diesel engine or a gas turbine engine); a compressor section 5 driven by the turbine section 3 so as to pressure-feed outside air 4 into the internal combustion engine; a casing 6 provided between the turbine section 3 and the compressor section 5 so as to support them; and a power generator 19 having a rotating shaft 19a connected to a rotating shaft 7 of the turbine section 3 and the compressor section 5.

Into the casing 6, there is inserted the rotating shaft 7, one end of which projects out to the turbine section 3 side and the other end of which projects out to the compressor section 5 side. This rotating shaft 7 is supported by a bearing 8 provided in the casing 6 so as to be able rotate about its axis. Moreover, in the casing 6, there is provided a lubricating oil supply passage 9 that supplies lubricating oil from a lubricating oil reservoir (not shown in the drawing) to the bearing 8.

Meanwhile, a bottom end section of the casing 6 becomes a foot section 6a that supports the casing 6 at one point in the axial direction of the rotating shaft 7 (in some cases it is supported at two or more points in the direction orthogonal to the axial direction of the rotating shaft 7), and this foot section 6a is fixed on a base (not shown in the drawing) installed on a floor surface. That is to say, the weight of the hybrid turbocharger 1 is transmitted to the base through this foot section 6a.

Reference symbol P in the drawing denotes a punching plate. One end section of this punching plate P is fixed on the bottom end section of the turbine section 3, and the other end section is fixed on the base as with the foot section 6a of the casing 6. The main purpose of this punching plate P is not to support the weight of the hybrid turbocharger 1 as with the foot section 6a, but to ensure that the hybrid turbocharger 1 does not shake (vibrate) with respect to the base.

The turbine section 3 has: an exhaust gas passage 10 connected to an exhaust system of the internal combustion engine so as to supply at least some portion of the exhaust gas 2; and a turbine 11 that receives a flow of the exhaust gas supplied into this exhaust gas passage 10 so as to be rotation-driven.

The turbine 11 is provided with a turbine rotor 12 and a turbine nozzle 13. The turbine rotor 12 has: a disk shaped turbine disk 12a provided on one end section of the rotating shaft 7; and a plurality of turbine blades 12b having an airfoil sectional shape attached to the outer periphery of this turbine disk 12a.

Moreover, the turbine nozzle 13 comprises a plurality of nozzle guide vanes 13a that are annularly arranged, and is arranged on the upstream side of the turbine blades 12b.

The exhaust gas passage 10 has: a supply passage 10a connected to the exhaust system of the internal combustion engine so as to guide the exhaust gas 2 to the nozzle guide vanes 13a and the turbine blade 12b; and a delivery passage 10b that is provided toward the radial direction outside of the turbine 11 to guide the exhaust gas 2 that has passed through the turbine 11, to outside of the system or to an exhaust gas purification device or the like (not shown in the drawing).

The compressor section 5 has: a compressor impeller 14 that is rotation-driven so as to send the outside air 4 to the radial direction outside; and a spiral chamber 15 that surrounds this compressor impeller 14 and compresses the outside air sent from the compressor impeller 14.

The compressor impeller 14 is provided with: a substantially disk-shaped hub 14a attached to the other end section of the rotating shaft 7; and a plurality of impeller blades 14b that extend from an external surface of the hub 14a toward the outside in the radial direction, and that are annularly provided in a ring around the circumferential direction.

Adjacent to the compressor section 5 on the upstream side, there is arranged a silencer 16 connected to an air intake system of the internal combustion engine so that the outside air 4 that has passed through this silencer 16 is introduced to the impeller blades 14b of the compressor impeller 14 via an inflow passage 17. Moreover, on the downstream side of the compressor section 5 there are provided an intercooler, a surge tank and so forth (not shown in the drawing), and after passing through these intercooler, surge tank and so forth, the outside air 4 that has passed through the spiral chamber 15 is supplied into the internal combustion engine.

Inside the center section of the silencer 16 there is provided a shell housing 18 having a concave section 18a formed so as to taper toward an end surface of the hub 14a, and the (high speed induction) power generator 19 is housed in the concave section 18a. The shell housing 18 is fixed on the compressor section 5 (on a wall surface on the radial direction outside that forms the inflow passage 17) via a plurality of (for example, four) supports 20 provided within the inflow passage 17. The outside surface of the shell housing 18 forms a wall surface on the radial direction inside that forms the inlet passage 17.

The power generator 19 is arranged so that the rotating shaft 19a thereof is positioned on the same line of axial rotation as that of the above mentioned rotating shaft 7, and this rotating shaft 19a is coupled via a coupling 21 to the tip end of the one end section of the rotating shaft 7 that passes through the hub 14 and that projects to the silencer 16 side. That is to say, the rotating shaft 19a of the power generator 19 rotates together with the rotating shaft 7.

Figure 3:
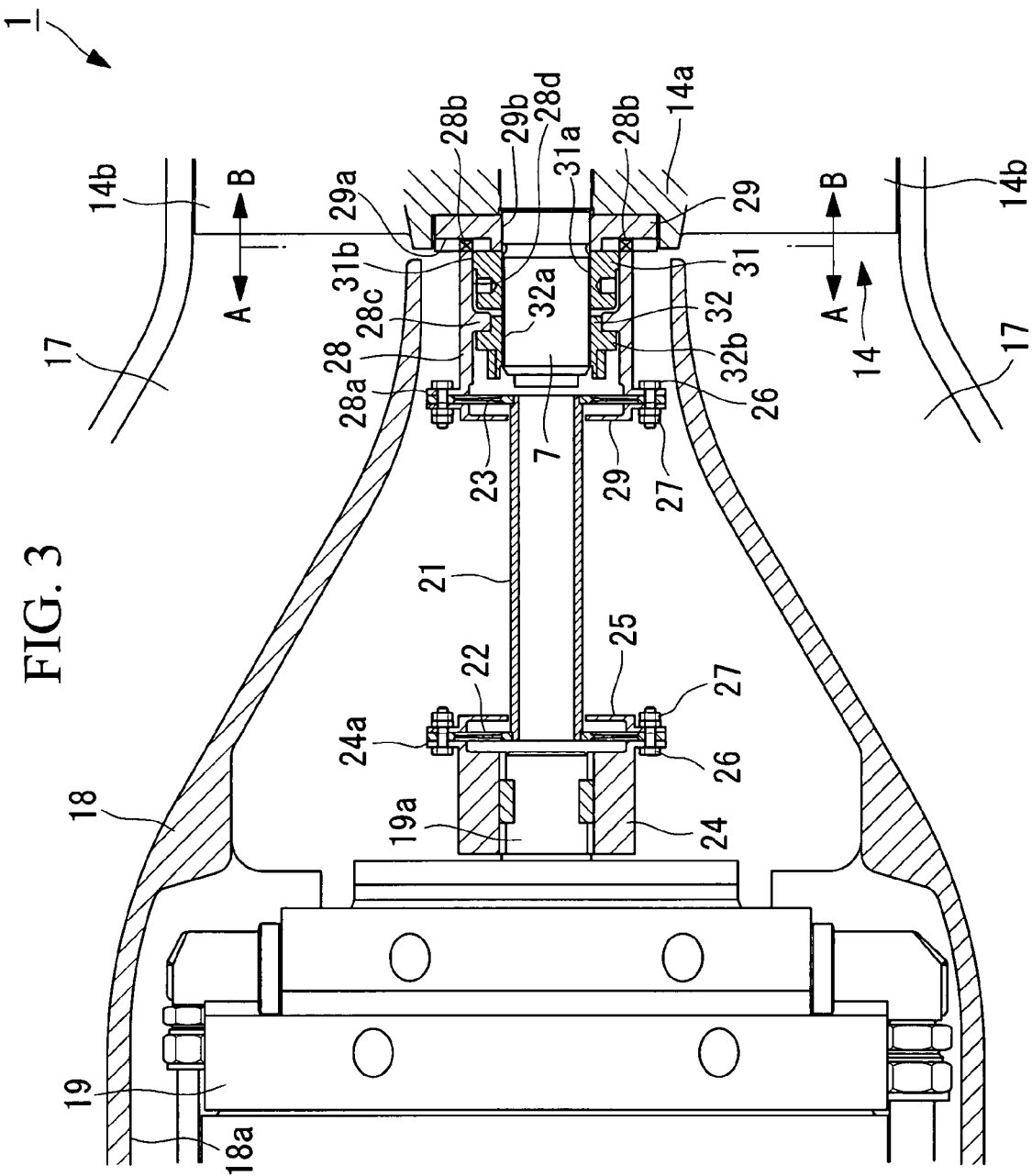
FIG. 3 is an enlarged longitudinal sectional view of a relevant section of the hybrid turbocharger shown in FIG. 1.

As shown in FIG. 3, on the tip end of one end section of the coupling 21 there is provided a first flange 22, and on the tip end of the other end section of the coupling 21 there is provided a second flange 23.

Moreover, on the tip end of the one end section of the rotating shaft 19a of the power generator 19 there is attached (fixed) a first coupling attachment boss 24. The first flange 22 of the coupling 21 is interposed between a flange section 24a provided on the tip end of the one end section of the first coupling attachment boss 24 and a flange holder 25, and it is attached (fixed) to the first coupling attachment boss 24 via a plurality of (for example, four) pairs of bolts 26 and nuts 27.

Meanwhile, on the tip end of the other end section of the rotating shaft 7 there is attached (fixed) a second coupling attachment boss 28. The second flange 23 of the coupling 21 is interposed between a flange section 28a provided on the tip end of the one end section of the second coupling attachment boss 28 and a flange holder 29, and it is attached (fixed) to the second coupling attachment boss 28 via a plurality of (for example, four) pairs of bolts 26 and nuts 27.

Figure 4A:
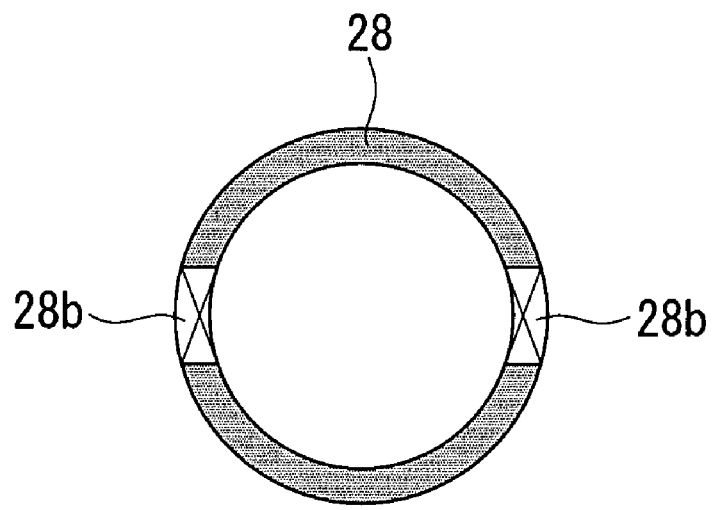
FIG. 4A is a cross-sectional view on arrows A-A in FIG. 3.
Figure 4B:
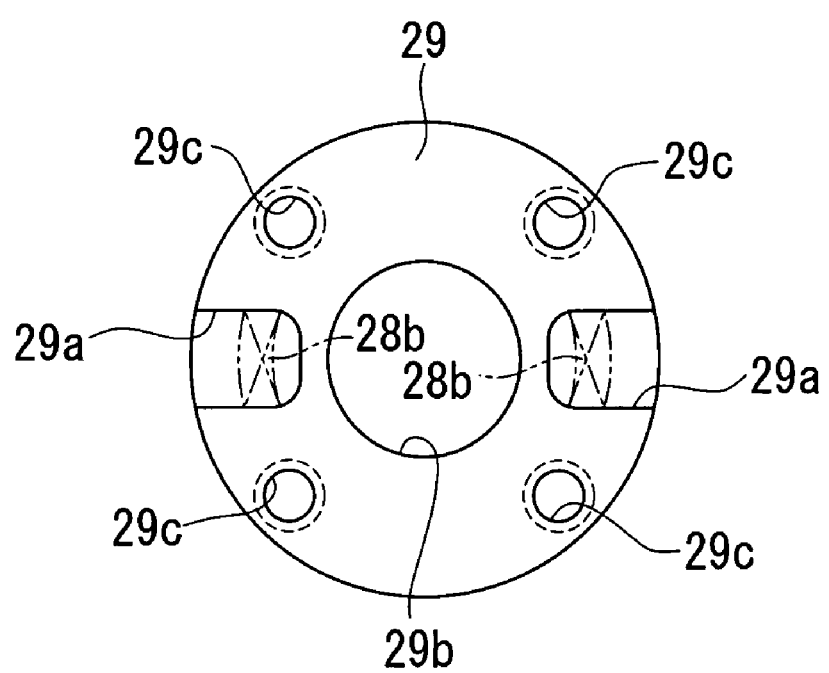
FIG. 4B is a cross-sectional view on arrows B-B in FIG. 3.

Furthermore, as shown in FIG. 3 and FIG. 4, on the tip end of the other end section of the second coupling attachment boss 28, there is provided in positions opposing to each other in the circumferential direction (positions on 180 degree opposite sides) a plurality of (two in the present embodiment) claw sections 28b to be respectively fitted to a plurality of (two in the present embodiment) groove sections (concave sections: cutaway sections) 29a provided on the surface of a washer that presses one end surface of the hub 14a (an end surface on the reduced diameter side), while on the inner circumferential surface of the second coupling attachment boss 28 in the substantially center in the lengthwise direction there is provided a ring shaped rib 28c that projects toward the radial direction inside.

The washer 29 has a through hole 29b in the center section thereof through which the other end section of the rotating shaft 7 is inserted, and it has a plurality of (four in the present embodiment) bolt holes 29c on its circumference section. These bolt holes 29c are arranged around the circumferential direction at substantially equal intervals (approximately every 90 degrees). Moreover, this washer 29 is fixed to the hub 14a via a plurality of (four in the present embodiment) fixing bolts (not shown in the drawing) inserted into these bolt holes 29c from the surface side of the washer 29.

Moreover, on the surface side of the washer 29 there is arranged a shaft end nut 31. The shaft end nut 31 has a through hole 31a in the center section thereof through which the tip end of the other end section of the rotating shaft 7 is inserted, and on the inner circumferential surface of this through hole 31a there is provided a female screw section (not shown in the drawing) that screws together with a male screw section (not shown in the drawing) provided on the outer circumferential surface of the tip end of the other end section of the rotating shaft 7. By fastening (screwing on) this shaft end nut 31 onto the tip end of the other end section of the rotating shaft 7, the back surface of the shaft end nut 31 is brought in contact with the surface of the washer 29 so that the washer 29 and the hub 14a can be prevented from coming out to the other end section tip end side of the rotating shaft 7, and the washer 29 and the hub 14a are fixed to the other end section of the rotating shaft 7.

Moreover, by providing an engaging surface 31b on the outer circumference of the shaft end nut 31 to be engaged with an inner circumferential surface 28d when the coupling attachment boss 28 is attached, the center core of the coupling attachment boss 28 can be easily aligned with the center core of the rotating shaft 7.

Furthermore, on the surface side of the shaft end nut 31 there is arranged a boss fixing nut 32. The boss fixing nut 32 has a through hole 32a in the center section thereof, through which the tip end of the other end section of the rotating shaft 7 is inserted, and on the inner circumferential surface of this through hole 32a there is provided a female screw section (not shown in the drawing) that screws together with a male screw section (not shown in the drawing) provided on the outer circumferential surface of the tip end of the other end section of the rotating shaft 7. Moreover, on the outer circumferential surface of the boss fixing nut 32 in the substantially center in the lengthwise direction there is provided a ring shaped rib 32b that projects toward the radial direction outside. By fastening (screwing on) this boss fixing nut 32 onto the tip end of the other end section of the rotating shaft 7, the back surface of the rib 32b is brought into contact with the front surface of the rib 28c and the tip end surface of the claw section 28b is brought in contact with the bottom surface of the groove sections 29a so that the second coupling attachment boss 28 is fixed onto the tip end of the other end section of the rotating shaft 7.

Next, procedures for removal and attachment of the coupling 21 and the second coupling attachment boss 28 are described.

First, in order to remove the coupling 21 and the second coupling attachment boss 28, the bolts 26 and the nuts 27 that join the flange section 24a and the flange holder 25 and the bolts 26 and the nuts 27 that join the flange section 28a and the flange holder 29 are respectively removed, and the coupling 21 is removed.

Once the coupling 21 has been removed and the connection between the first coupling attachment boss 24 and the second coupling attachment boss 28 has been severed, the boss fixing nut 32 is loosened and removed from the tip end of the other end section of the rotating shaft 7, and then the second coupling attachment boss 28 is removed from the tip end of the other end section of the rotating shaft 7.

Moreover, in order to attach the coupling 21 and the second coupling attachment boss 28, the second coupling attachment boss 28 is set so that the claw sections 28b of the second coupling attachment boss 28 are fitted into the groove sections 29a of the washer 29, and in this state, the boss fixing nut 32 is fastened to the tip end of the other end section of the rotating shaft 7 to attach the second coupling attachment boss 28 to the tip end of the other end section of the rotating shaft 7.

When the second coupling attachment boss 28 has been attached to the tip end of the other end section of the rotating shaft 7, the coupling 21 is set between the first coupling attachment boss 24 and the second coupling attachment boss 28, and the bolts 26 and the nuts 27 that join the flange section 24a and the flange holder 25, and the bolts 26 and the nuts 27 that join the flange section 28a and the flange holder 29 are respectively attached, to thereby attach the coupling 21.

According to the hybrid turbocharger 1 of the present embodiment, the second coupling attachment boss 28 to which the coupling 21 is attached, can be easily and quickly removed just by loosening the boss fixing nut 32 fastened onto the tip end of the other end section of the rotating shaft 7 and removing this boss fixing nut 32 from the tip end of the other end section of the rotating shaft 7. Moreover, the second coupling attachment boss 28 to which the other end section of the coupling 21 is attached can be easily and quickly attached just by attaching the boss fixing nut 32 to the tip end of the other end section of the rotating shaft 7 and fastening this boss fixing nut 32 to the tip end of the other end section of the rotating shaft 7. As a result, the amount of operation time required for an overhaul of a turbocharger can be reduced.

Moreover, in the case where a key or the like is used when attaching the second coupling attachment boss 28 to the tip end of the other end section of the rotating shaft 7, the structure (shape) of the tip end of the other end section of the rotating shaft 7 needs to have a structure (shape) different from that of a conventional rotating shaft (existing rotating shaft). However, in the present invention, such a structure (shape) change does not have to be made. Therefore, the present invention can easily be applied to a conventional rotating shaft (specifically to an existing turbocharger).

Furthermore, since the claw sections 28b provided on the tip end of the other end section of the second coupling attachment boss 28 are configured so as to respectively fit into the groove sections 29a provided in the surface of the washer 29, the rotational torque of the rotating shaft 7 can be reliably transmitted to the coupling 21 via these claw sections 28b and the groove sections 29a.

What is claimed is:

1. A hybrid turbocharger comprising:
   a turbine section that is driven by exhaust gas introduced from an internal combustion engine;
   a compressor section that is driven by the turbine section to pressure-feed outside air into the internal combustion engine; and
   a power generator having a rotating shaft coupled to a rotating shaft of said turbine section and said compressor section via a coupling,
   wherein a coupling attachment boss to which one end section of said coupling is coupled, intervenes and is fixed, via a boss fixing nut that screws onto a screw section formed on a tip end of one end section of the rotating shaft of said turbine section and said compressor section, between one end surface of a turbine rotor that constitutes said turbine section or one end surface of a compressor impeller that constitutes said compressor section, and said boss fixing nut.

2. A hybrid turbocharger according to claim 1, wherein on the one end surface of said turbine rotor or on the surface of a washer fixed on the one end surface of said turbine rotor, or on the one end surface of said compressor impeller or on the surface of a washer fixed on the one end surface of said compressor impeller, there is provided at least one groove section, and, on a tip end of one end section of said coupling attachment boss there is provided a claw section that is fitted into said groove section.

3. An internal combustion engine equipped with a hybrid turbocharger according to either one of claim 1 and claim 2.

* * * * *